US006870916B2

(12) United States Patent
Henrikson et al.

(10) Patent No.: US 6,870,916 B2
(45) Date of Patent: Mar. 22, 2005

(54) TARGETED AND INTELLIGENT MULTIMEDIA CONFERENCE ESTABLISHMENT SERVICES

(75) Inventors: Eric Harold Henrikson, Remond, WA (US); Chinmei Chen Lee, Woodbridge, IL (US); Stinson Samuel Mathai, DesPlaines, IL (US); Donna Michaels Sand, Remond, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 339 days.

(21) Appl. No.: 09/953,509

(22) Filed: Sep. 14, 2001

(65) Prior Publication Data

US 2003/0053612 A1 Mar. 20, 2003

(51) Int. Cl.[7] .............................................. H04M 3/42
(52) U.S. Cl. ............. 379/202.01; 379/158; 379/203.01; 455/416
(58) Field of Search ...................... 379/202.01, 455.416, 379/203.01, 204.01

(56) References Cited

U.S. PATENT DOCUMENTS

| | | | | | |
|---|---|---|---|---|---|
| 4,965,819 A | * | 10/1990 | Kannes | ..................... | 348/14.07 |
| 6,163,692 A | * | 12/2000 | Chakrabarti et al. | ........ | 455/416 |
| 6,275,575 B1 | * | 8/2001 | Wu | ........................ | 379/202.01 |

FOREIGN PATENT DOCUMENTS

EP 1098504 * 5/2001 ............ H04M/3/56

OTHER PUBLICATIONS

Kaukonen S. et al.: "Agent based conferencing using mobile IP–telephony" IEEE Workshop on Multimedia Signal Processing. Proceedings of Signal Processing Society Workshop on Multimedia Signal Processing, XX, XX, Sep. 13, 1999, pp. 593–598, XP002160273.*

* cited by examiner

*Primary Examiner*—Ahmad F. Matar
*Assistant Examiner*—Karen Le

(57) ABSTRACT

In a multimedia communications system (100), a conference establishment server coordinates the scheduling of a conference call. The server receives request for conference calls (202). The request includes a list of participants and may include an indication of the resources necessary and any rules for the conference call. The request may indicate critical resources or participants that are required for the call. Based on the request, the server determines a conference time and notifies participants of the time (204, 206, 210). Prior to conference time, participants are reminded of the time and automatically connected to the call. The server may check the status of users on the telecommunications network to determine availability. If a critical participant or resource is unavailable at conference time, the conference may be cancelled with notification to the participants.

10 Claims, 4 Drawing Sheets

TARGETED AND INTELLIGENT MULTIMEDIA CONFERENCE ESTABLISHMENT SERVICES

FIELD OF THE INVENTION

The invention generally relates to telecommunications networks, and in particular, to the provision of conference services in a multimedia mobile telecommunications network.

BACKGROUND OF THE INVENTION

Wireless communication systems are well known. Wireless communication systems allow mobile radiotelephones to communicate with each other and other networks, such as the Internet and the public telephone network. First and second generation wireless telephone systems are generally constrained in the amount of bandwidth available for communication. This limits capacity and also the types of services that are provided. Third generation wireless systems hold the promise of greater bandwidth, thereby increasing capacity and allowing for enhanced services, such as multimedia services. Third generation wireless communications devices include, in addition to a voice communication interface, capability for communication of data and display of data, including video.

Conference calls between multiple participants at different locations are known. Conference calls improve efficiency by reducing travel time and costs associated with face-to-face meetings. The establishment of a conference call requires several steps. First, a day and time for the conference call must be established. This generally entails contacting each conference participant to determine common availability. This step alone can take an enormous amount of time, especially where potential participants are not readily accessible. After a date and time are set for the conference call, resources to facilitate the call must be reserved. For example, a conference bridge for an audio or video portion of the conference may be reserved. Also, attachments or exhibits, such as slides, video clips or other presentation aides, may be provided to conference participants, usually in advance of the day and time for the conference. Once the necessary resources are reserved and allocated for the conference call, conference access data may need to be supplied to each participant. For example, a conference bridge number and password may need to be distributed to conference participants to permit calling into the conference bridge. The steps described above complete the setup of the conference call. The actual conference call requires additional steps. Namely, each conference participant must connect to the conference call at the appropriate time with the appropriate capability to interact with other participants, including possibly the exchange of audio data, video data, files, conference presentation materials and the like.

Unfortunately, the steps required for a successful conference call are cumbersome and time consuming. Nonetheless, conference calls are increasingly useful and important. And, with the advent and proliferation of proposed third generation wireless systems, ubiquitous availability and capability will only make conference calls more important.

Therefore, a need exists for improved conference call establishment services to improve the efficiency of conference calls.

SUMMARY OF THE INVENTION

In accordance with one aspect of the present invention a method is provided for scheduling a conference call. The method begins with the receipt of a request for a conference call. The request for the conference call includes at least the participants for the call. Preferably, the request also includes resources for the call and rules for the call. Some resources and participants may be designated critical and therefore, required for the call. After the request is received, participant availability is determined. Preferably, participant availability is determined by examining calendars for the participants for the call. Based on availability, a conference time is selected. The participants are notified of the conference time and preferably have an opportunity to confirm availability at the conference time or suggest an alternate time. Once a conference time is determined, the resources necessary for the call, for example, a conference bridge and conference number, are reserved for use.

In another aspect of the present invention, after a conference time has been scheduled, prior to the beginning time for the conference, the conference participants are notified of the impending start time. This notification is preferably made via a text, audio or video message. If critical resources or participants have been identified, availability of those resources and participants may be required before beginning the conference call. Once the necessary resources and participants are available, the conference call is established with participants.

A conference establishment server resides in or is coupled to a telecommunications network. The conference establishment server coordinates resource and participant availability and conference establishment. The conference establishment server receives a request for a conference call, including an indication of participants for the conference call; determines a commonly available time of participants for the conference call; sends to participants a notification of a conference time for the conference call; reserves resources for the conference call; and determines whether the conference should take place according to predetermined rules.

DESCRIPTION OF THE PREFERRED EMBODIMENTS

Figure 1:
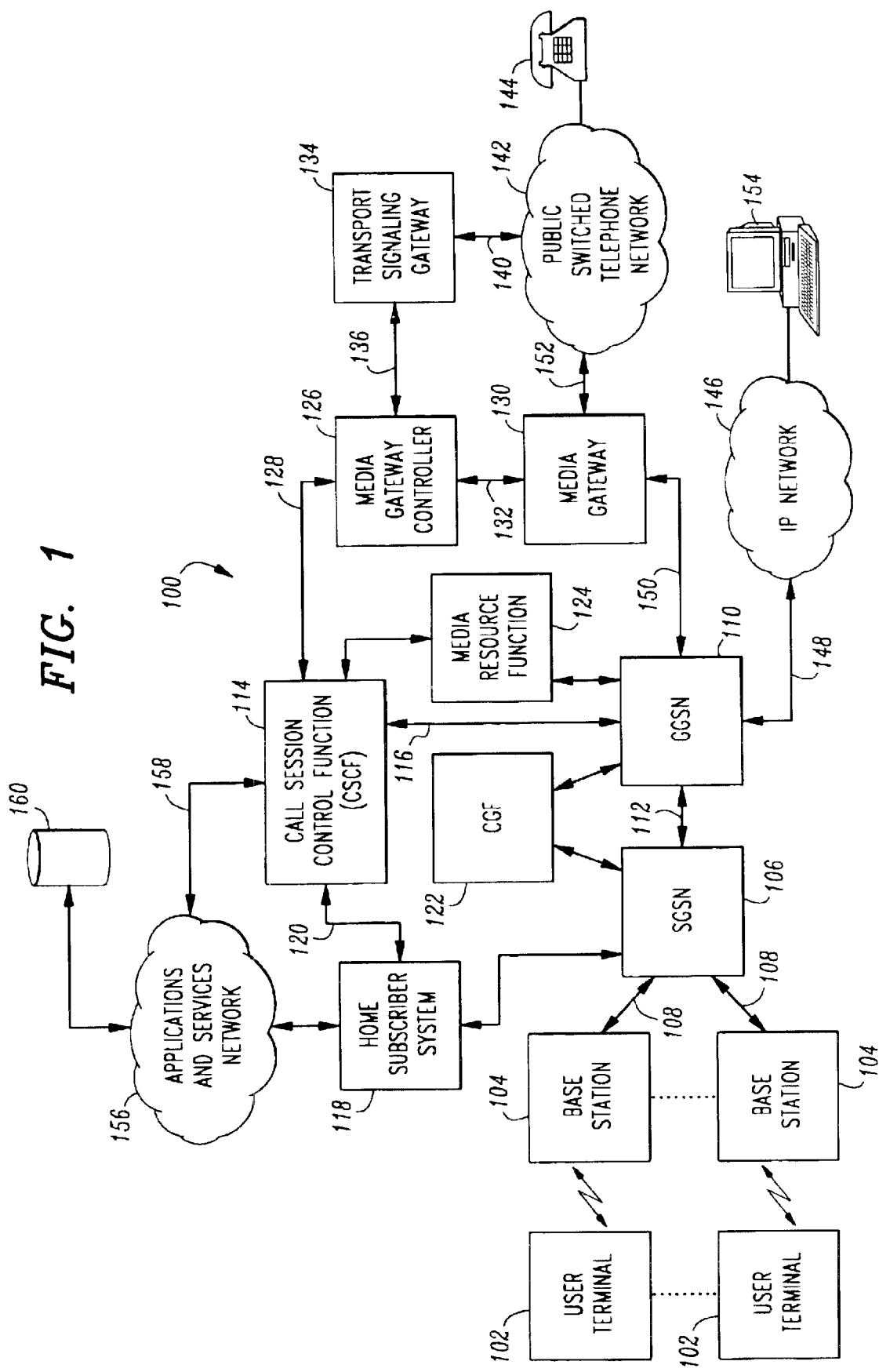
FIG. 1 is a block diagram of a multimedia services network that provides conference establishment services in accordance with the present invention.

FIG. 1 is a block diagram of a preferred embodiment of a multimedia communications system 100 in accordance with the present invention. Users interact with multimedia communications system 100 via user equipment or user terminals 102. Multimedia communications system 100 includes a third generation wireless system, as defined by the $3^{rd}$ Generation Partnership Program, also known as 3GPP (see 3gpp.org). User terminal 102 is typically a mobile device that includes a user interface and an interface for coupling to communications system 100. The user interface of user terminal 102 is typically referred to as terminal equipment and generally includes an audio interface, such as a microphone and speakers, a visual interface, such as a display, and a user input interface, such as a keyboard or touch pad. The interface for coupling to communications system 100 is typically referred to as a mobile terminal and generally includes an over-the-air interface for transmitting and receiving data.

The over-the-air interface of user terminal 102 is used to communicate with base stations 104. In the preferred embodiment, base stations 104 include an over-the-air interface that is complementary to the over-the-air interface of user terminal 102. Most preferably, user terminal 102 and base stations 104 communicate over-the-air using a packet-based protocol.

Multimedia communications system 100 provides users with a variety of options for communication. Users are able to transmit and receive multimedia communications, including audio, voice, video, and all types of data. Multimedia communications system 100 provides access to data networks, such as the Internet, and public telephone networks, including wireless networks.

In the preferred embodiment, the multimedia communications that are directed to and received from users via base stations 104 are coordinated and transferred using a serving GPRS (GSM Packet Radio System) support node (SGSN) 106, a gateway GPRS support node (GGSN) 110, a call session control function (CSCF) 114 and a home subscriber system 118. SGSN 106 coordinates multimedia transmissions to and from base stations 104. SGSN 106 is coupled to GGSN 110 via a data link 112. GGSN 110 interfaces the multimedia communications to and from SGSN 106 to other networks. Call session control function 114 is coupled to GGSN 110 via a data link 116. Call session control function 114 coordinates and executes a signaling protocol used to establish, maintain and control calls or sessions for communications involving user terminals 102. A home subscriber system 118 is coupled to call session control function 114 via a data link 120. Home subscriber system 118 includes subscriber profile information, including information traditionally associated with a home location register for a mobile subscriber.

To facilitate ancillary and support functions within multimedia communications system 100, a charging gateway function (CGF) 122 and a media resource function 124 are provided. Charging gateway function 122 is coupled to SGSN 106 and GGSN 110 to account for packets passing through these elements for accounting, billing and other purposes. Media resource function 124 is coupled to call session control function 114 and to GGSN 110. Media resource function 124 provides resources for conference bridging, tones, announcements, text-to-speech conversion, automatic speech recognition and other service functions for communications through GGSN 110.

GGSN 110 couples user terminals 102 to other networks. In particular, GGSN 110 is coupled to an Internet protocol (IP) network 146 via a data link 148. Data link 148 preferably implements a packet-based protocol for transfers to a data network. Data link 148 and IP network 146 provide access to any elements connected to IP network 146, such as, for example, a computer 154. GGSN 110 is also coupled to a media gateway 130 via a data link 150. Media gateway 130 is in turn coupled to a public switched telephone network 142 via a communications link 152. Media gateway 130 converts packetized voice received from GGSN 110 to a circuit-switched protocol acceptable to the public switched telephone network 142. Conversely, media gateway 130 converts circuit-switched communications received from public switched telephone network 142 to packetized communications acceptable to GGSN 110. Media gateway 130, data link 150, and communications link 152 provide an interface for user terminals 102 to the public switched telephone network 142. By virtue of this connection, user terminals 102 are coupled to elements attached to the public switched telephone network, such as telephone 144.

The signaling and control necessary to interface GGSN 110 with public switched telephone network 142 is controlled and provided by call session control function 110, a media gateway controller 126 and a transport signaling gateway 134. Media gateway controller 126 is coupled to call session control function 114 via a data link 128. Media gateway controller 126 is coupled to control media gateway 130 via data ink 132. Call session control function 114 determines based on a signaling protocol any necessary media gateway resources needed for a particular communication or session. These needs are transmitted to media gateway controller 126, which in turns configures and establishes the necessary resources in media gateway 130 and also provides the necessary signaling to transport signaling gateway 134. The resources in media gateway 130 are configured to transfer the actual (bearer) data between the GGSN 110 and the public switched telephone network 142. Transport signaling gateway 134 converts the signaling protocol from the media gateway controller 136 to a signaling protocol necessary for public switched telephone network 142.

Applications and services are preferably coupled to multimedia communication system 100 for use in interaction with user terminals 102. In particular, call session control function 114 is coupled to an applications and services network 156 via a data link 158. Also, home subscriber system 118 is preferably coupled to application and services network 156. A myriad of services and applications may reside in or be coupled to application services network 156, including database services from a database 160.

In the preferred embodiment, SGSN 106, GGSN 110, CGF 122, media resource function 124, CSCF 114, media gateway controller 126, media gateway 130, and home subscriber system 118 are processor-based apparatus with data link interfaces for coupling together as described above and shown in FIG. 1. These apparatus include one or more processors that execute programs to implement the functionality described herein and generally associated with third generation wireless systems.

Figure 2:
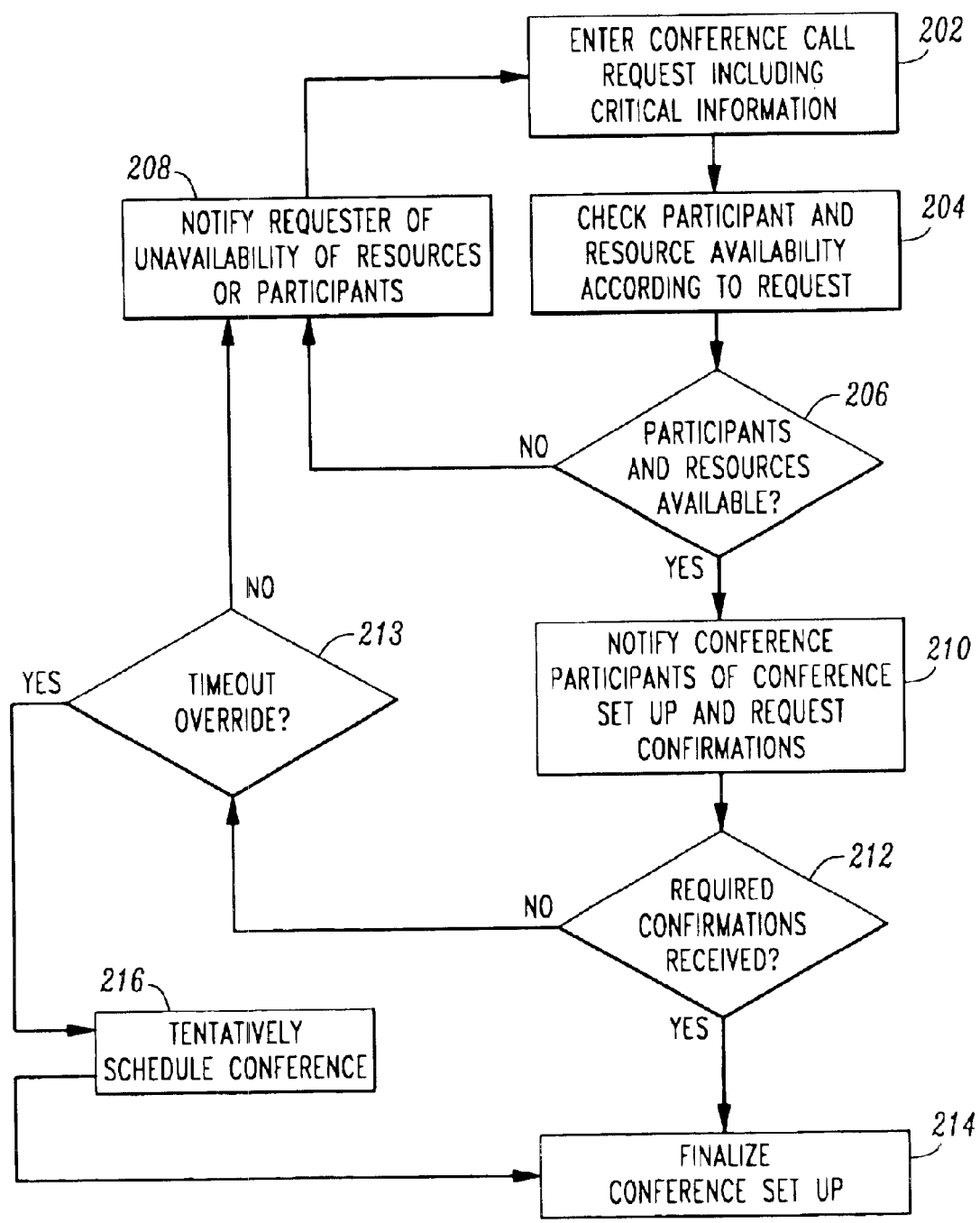
FIG. 2 is a flow chart illustrating a method for scheduling multimedia conference services in accordance with the present invention.

FIG. 2 is a flow chart illustrating a method for scheduling a conference call in accordance with the present invention. FIG. 2 is described below with reference to the preferred embodiment shown in FIG. 1. The method for scheduling a conference call preferably begins when a conference requester enters a conference call request including all information necessary for the conference call (202). Preferably, the request is in the form of a Web page interface accessible by a user terminal 102 or any other terminal device that couples to multimedia communications system 100. Most preferably, the request is received, and the method is executed, by a conference establishment server, which is alternatively, a server in applications and services network 156 or implemented by any processor-based apparatus discussed above or shown in FIG. 1. The information necessary for the conference call preferably includes a list of participants, an indication of resources desired for the call, and rules for the conference call. Preferably, some information is designated as critical, indicating that the particular information or resource may be necessary for the conference call. For example, a speaker that will present information on the conference call may be designated a critical participant, since without the speaker the information will not be presented. The list of participants preferably includes contact information for the participants, such as a telephone number or IP address. Most preferably, the list of participants includes availability information for the participants, such as available dates and times or the location of an electronic calendar with available dates and times. The resources specified for a call include conference bridge circuits, audio and video mixing circuits, software necessary for sharing files and other information, or any other resources desired or needed for the conference call. The rules for the conference call generally include limitations on the call, for example, a time of day or a particular day of week.

Once the conference call request is entered (202), the conference establishment server initiates a check on the availability of the necessary participants and resources, as specified in the request (204). Preferably, participant availability is determined by checking an electronic calendar associated with the participant. Alternatively, participant availability is supplied with the request for the conference call or it is determined by direct contact with the participant, such as via an e-mail, text message, telephone call, interactive multimedia session, or Web interface. Direct contact with the participant should include the ability to receive input from the participant. Direct contact with the participant may or may not require human intervention. Participant availability information is returned to the conference establishment server.

Resource availability is preferably determined by assessing resources necessary based on the participants, resources and rules associated with the request. After an assessment of the necessary resources, functions supplying those resources are queried for availability. For example, media resource function 124 may be queried by the conference establishment server to determine if and when a bridge for audio/video conferencing is available to interconnect four participants using user terminals 102. The availability information associated with resources is returned to the conference establishment server.

The conference establishment server uses the participant availability information and the resource availability information to determine if there is a day and time at which the participants and resources are available for a conference call (206). If no available day and time is found, the requester of the conference call is notified (208), including a notification of the unavailable participants or resources. The requester may then use this information to adjust the conference call request (202).

If the conference establishment server determines a time and a date at which the participants and resources are available for a conference call (206), then the conference participants are notified of the conference date and time and any additional information needed for setup of the conference call (210). In addition, confirmation of availability is requested by the conference establishment server (210). Preferably, the notification to the conference participants is conveyed via a text message, audio message, video message, interactive multimedia session, or a combination of these, automatically generated by the conference establishment server. For example, a user terminal may receive a text message indicating a date and time for a conference call, a listing of attributes for the call, such as audio, video, and a request for confirmation of availability. Preferably, any materials associated with the conference call, such as presentation materials or files, are sent to users with the notification of the conference date and time.

The conference establishment server determines whether it received a confirmation from the conference participants (212). Preferably, critical participants must be confirmed and non-critical participants may be confirmed. That is, the requester may require some confirmations, but may not require confirmation from all participants. Most preferably, the request for confirmation allows a participant to enter alternate availability times, if necessary. If the necessary confirmations are not received, indicating unavailability of critical participants for the conference call, then a determination is made as to whether the conference requester has specified an option for a timeout override (213). Preferably, a timeout override option automatically confirms participants who fail to respond to a confirmation request within a predetermined amount of time. That is, if a required confirmation is not received from a participant within a predetermined period of time, then the participant is confirmed. The timeout override option permits tentative scheduling of the conference call without undue delay in spite of lack of a critical confirmation. If there is a timeout override option, then when the timeout period expires, the conference is tentatively scheduled, even though critical participants may not be confirmed (216). If there is not a timeout override option (213), and required confirmations are not received (212), then the conference call requester is notified of the unavailability of participants or resources (208). Preferably, this notification is conveyed via a text message, audio message, video message, interactive multimedia session, or a combination of these, automatically generated by the conference establishment server. The requester may adjust the parameters for the conference call request as a result of determining a participant is unavailable (208, 202).

If the necessary confirmations are received (212), or after tentatively scheduling the conference call (216), then the conference setup is finalized (214). Preferably, finalizing the conference call setup includes reserving the necessary resources for the conference call. Most preferably, the participants' calendars are annotated to indicate the scheduled conference call. Also, any materials associated with the conference call, if they have not previously been sent, are sent to participants via email, a text message, a video message, an interactive multimedia session or via a courier service. Alternatively, materials associated with the call are sent to participants any time prior to or during the conference call. Also, at setup finalization (214) or thereafter, participants receive access codes or any other data needed for the call, such as passwords.

Figure 3:
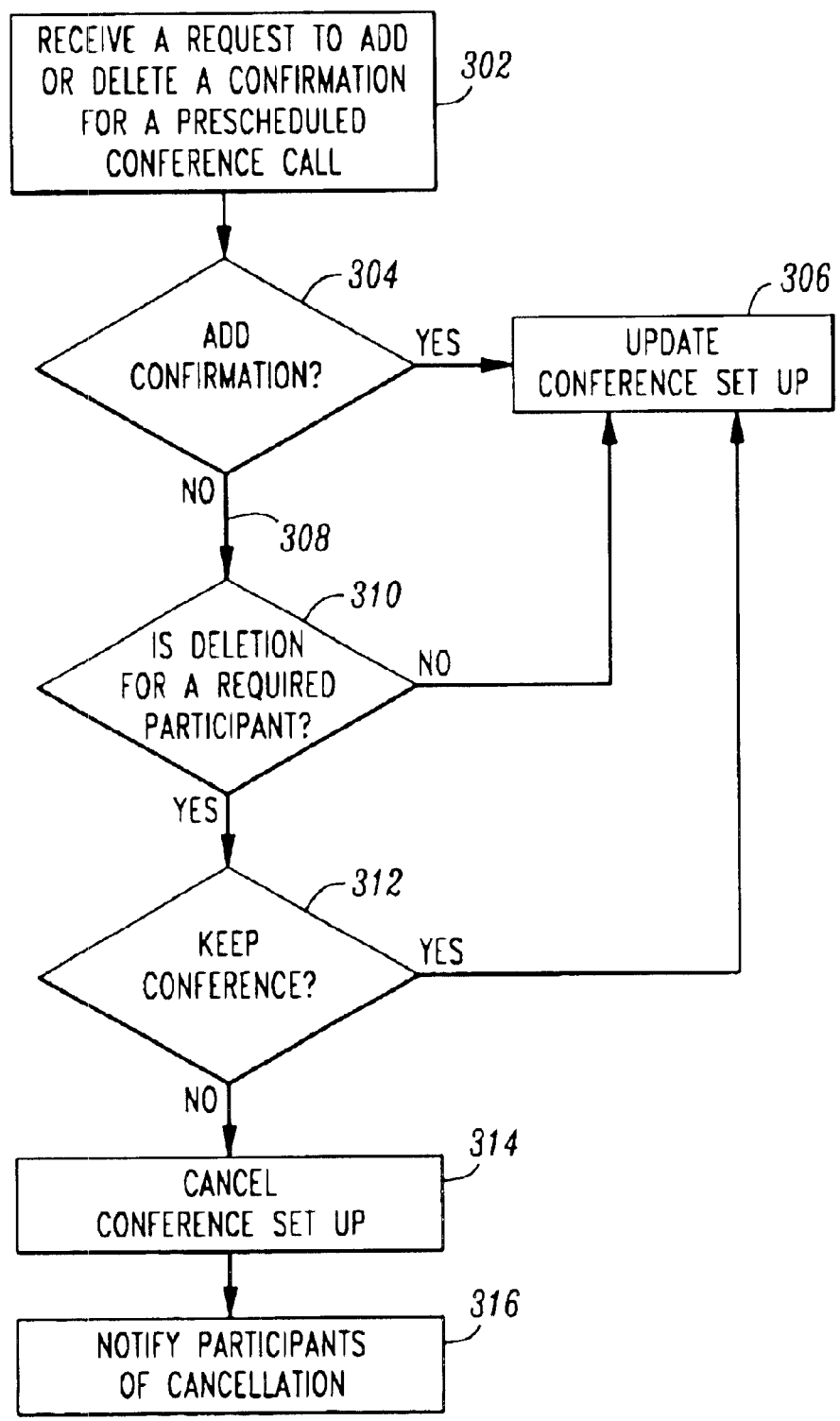
FIG. 3 is a flow chart illustrating a method for changing a prescheduled conference call in accordance with the present invention.

FIG. 3 is a flow chart illustrating a method for changing a prescheduled conference call in accordance with the present invention. Preferably, the conference establishment server executes the method for changing the prescheduled conference call. Any time prior to the time set for the conference call, the conference establishment server may receive a request from a confirmed or unconfirmed participant to add or delete a confirmation (302). Preferably, the participant enters the request via user terminal 102. Then, the conference establishment server determines whether the participant wants to add a confirmation (304). If the participant merely adds a confirmation, then the conference setup is updated (306). Updating the conference setup preferably includes sending notification to the conference requester and conference participants.

If the participant wants to delete a confirmation (308), then a determination is made as to whether the deletion is for a required participant (310). If the deletion is not for a required participant, then the conference setup is merely updated (306). If the deletion is for a required participant, as in the case where a conference was tentatively scheduled (216), then a determination is made as to whether the requester wants to proceed or not proceed with the conference call (312). If the requester wants to proceed, then the conference setup is updated (306). If the requester does not want to proceed, then the prescheduled conference call is canceled (314) and the participants are notified about the cancellation (316). The determination as to whether to proceed with the conference call (312) is preferably made through an interactive exchange, such as multimedia messaging between the conference establishment server and the requester. Alternatively, the server may be preprogrammed to make this choice based on a default setting or input from the requester, which input may be supplied as a part of the conference call request (202).

Figure 4:
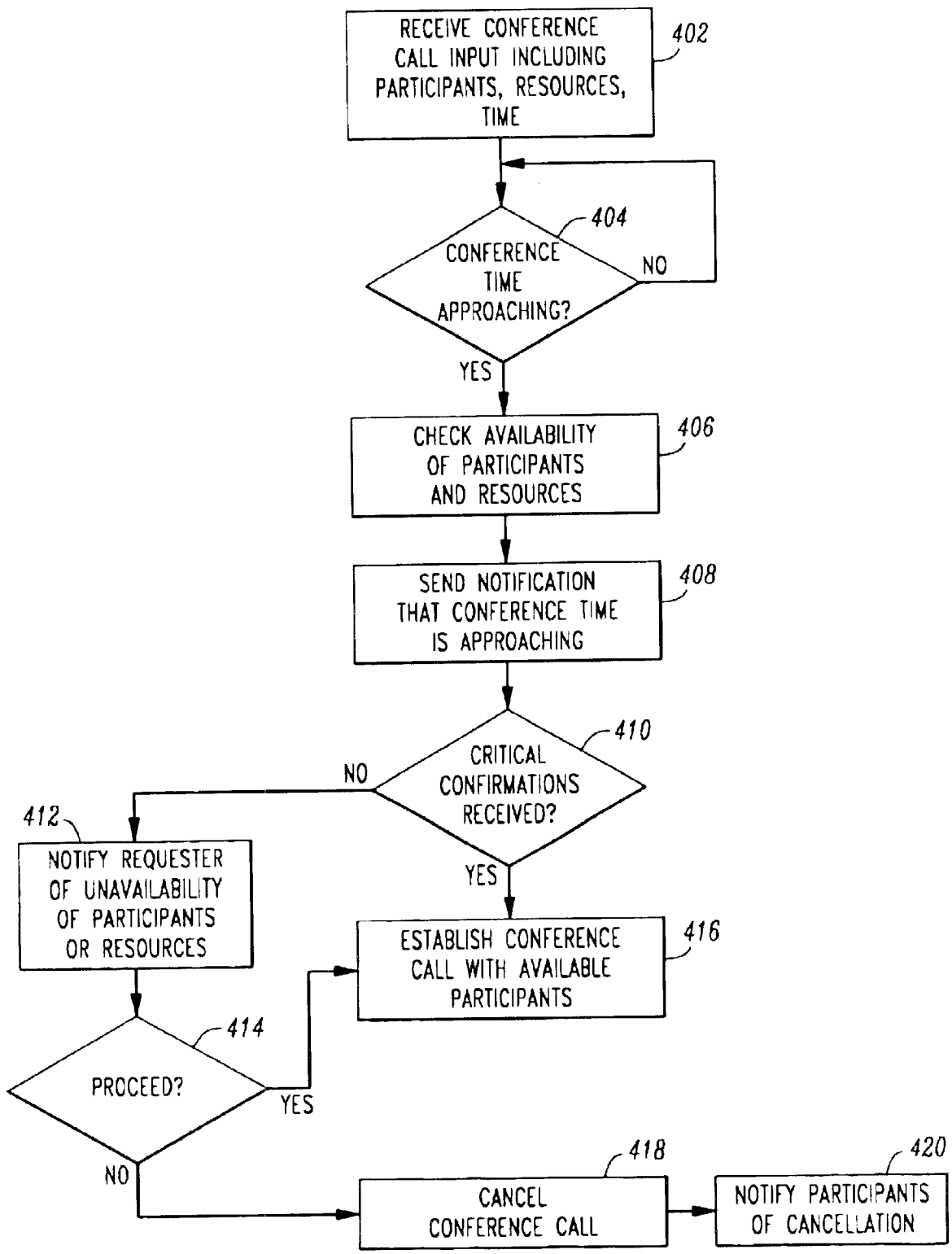
FIG. 4 is a flow chart illustrating a method for establishing a prescheduled conference call in accordance with the present invention.

FIG. 4 is a flow chart illustrating a method for establishing a prescheduled conference call in accordance with the present invention. Preferably, the conference establishment server executes the method for establishing the prescheduled conference call in coordination with the necessary resources for the call. First, the conference establishment server receives the input necessary for the conference call, including participants, rules, resources and the time and date for the conference call (402). Preferably, this information is generated as a result of execution of the method described above with respect to FIG. 2. Alternatively, the conference call information is entered directly by a user.

When the time for the conference call approaches (404), the conference establishment server does a preliminary check on the availability of participants and resources (406). In the preferred embodiment, where the participants are associated with a user terminal 102, the presence and availability of user terminal 102 is determined by querying home subscriber system 118. Most preferably, home subscriber system 118 maintains data on the presence of user terminals 102, including whether and where a user terminal 102 may be roaming. Also, home subscriber system 118 may maintain alternate contact information for a participant associated with a particular user terminal 102. Where the participants are not associated with a user terminal 102, a preliminary check on availability may or may not be required. Resource availability is determined by querying the functions that provide the resources. For example, media resource function 124 may be queried to determine if a conference bridge circuit is available. Or, SGSN 106 may be queried to determine if bandwidth is available for communications with a user terminal 102. Preferably, the preliminary check of participants and resources (406) does not result in canceling the scheduled conference call, but may result in notification to a conference requester that there is the potential for problems with the conference call.

Preferably, once the conference time approaches, a notification is sent to the participants (408). For example, five minutes prior to a schedule conference call, each participant may receive a notification via email, a text message, an audio message, a video message, an interactive multimedia session, or a combination of these, to indicate that a conference call will begin in five minutes. Most preferably, the notification includes an option for at least critical participants to confirm availability for the approaching conference (410). If required confirmations are not received (410), then a conference call requester is notified of the unavailability of a critical participant (412). Also, unavailability of a critical resource may require a similar notification to a conference requester. The conference requester may elect to proceed or not proceed with the conference call (414). An election to proceed preferably includes sending conference access instructions to unconfirmed participants to allow these participants to join in the call when they are available. An election not to proceed results in the conference call being canceled (418), and all participants are notified of the cancellation (420).

If, on the other hand, the requester elects to proceed in spite of lacking confirmation from some critical participant (414), or all required confirmations are received (410), then the conference call is initiated (416). Preferably, the conference call is established by a server setting up the necessary bearer resources and initiating calls to the available participants. This may entail establishing calls with alternate contacts or on roaming systems for mobile participants, such as participants using user terminals 102. Also, the availability of resources and capabilities for communication and file sharing at a user terminal may be checked. In the preferred embodiment, conference call establishment may also include sending a SIP (Session Initiation Protocol) INVITE message (as defined by Internet Engineering Task Force—IETF—RFC 2543) to participants to establish multimedia sessions. As an alternative to a server initiating calls, participants of the conference call may call into a conference bridge, which may or may not include a password for security. Most preferably, a server confirms that all critical participants have bearer resources for the conference call before a notification is given to the participants to begin the call.

The present invention provides for the scheduling of conference calls in a multimedia telecommunications network based on the availability of participants and resources. First, there is a conference call request. A conference establishment server receives the request. Then, the conference establishment server determines whether the necessary participants and required resources are available for the conference call. If so, then the conference establishment server sets up a conference time, notifies the participants of the conference time, and requests confirmations from the participants. Advantageously, this invention allows a party to set up a conference call in a very timely and cost efficient manner.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. In a multimedia telecommunications system including a user terminal, a server for conference establishment and a means for facilitating communication between the user terminal and the server, a method for scheduling a conference call comprising the steps of:

the server receiving a request for a conference call, including an indication of participants for the conference call; the server determining an availability of participants for the conference call;

the server notifying participants of a conference time for the conference call;

the server requesting confirmation from participants of availability for the conference call, where at least one participant is designated a critical participant, where a critical participant is deemed required for the conference call;

the server designating a predetermined amount of resources as critical resources, where critical resources are deemed necessary for the conference call;

the server reserving the critical resources for the conference call;

the server determining that the conference time is approaching;

the server determining an availability of participants and resources for the conference time;

the server sending a notification to participants that the conference time is approaching; and the server canceling the conference call if a critical participant or critical resource is unavailable.

2. The method of claim 1 further comprising the step of the server adjusting the conference time based on a response to a request for confirmation.

3. The method of claim 1 wherein the request for a conference call includes rules governing the conference call.

4. The method of claim 1 wherein the step of determining the availability of participants and resources includes at least one of checking a calendar associated with a participant and determining whether a mobile user terminal is available.

5. In a multimedia telecommunications system for coupling users for voice and multimedia communications, an apparatus for scheduling conference calls, comprising:

a user terminal;

a server for conference establishment; and a means for facilitating communication between the user terminal and the server, where the server is programmed to:

receive a request for a conference call, including an indication of participants for the conference call;

notify participants of a conference time for the conference call;

request confirmation from participants of availability for the conference call;

include an indication of at least one participant that is designated a critical participant for the conference call, where a critical participant is deemed necessary for the conference call;

designate a predetermined amount of resources as critical resources, where critical resources are deemed necessary for the conference call;

reserve at least critical resources for the conference call;

determine that the conference time is approaching;

determine an availability of participants and resources for the conference time;

send a notification to participants that the conference time is approaching; and cancel the conference call if a critical participant or critical resource is unavailable.

6. The apparatus of claim 5 wherein the server is programmed to adjust the conference time based on a response to a request for confirmation.

7. The apparatus of claim 5 wherein the request for a conference call includes rules governing the conference call.

8. The apparatus of claim 5 wherein the server is programmed to determine the availability of participants by checking a calendar associated with a participant and determining whether a mobile user terminal is available.

9. The apparatus of claim 5 wherein the server is programmed to reserve at least one of a conference bridge and a conference number as resources.

10. The apparatus of claim 5 wherein the server is programmed to send materials associated with the conference call to participants.

* * * * *